United States Patent
Malmberg et al.

(10) Patent No.: US 6,234,206 B1
(45) Date of Patent: May 22, 2001

(54) HOMOGENIZER VALVE

(75) Inventors: Rolf Malmberg, Lund; Rikard Hanson, Eslov, both of (SE)

(73) Assignee: Tetra Laval Holdings & Finance S.A., Pully (SE)

( * ) Notice: Subject to any disclaimer, the term of this patent is extended or adjusted under 35 U.S.C. 154(b) by 0 days.

(21) Appl. No.: 09/403,479

(22) PCT Filed: Apr. 21, 1998

(86) PCT No.: PCT/SE98/00720

§ 371 Date: Feb. 11, 2000

§ 102(e) Date: Feb. 11, 2000

(87) PCT Pub. No.: WO98/47606

PCT Pub. Date: Oct. 29, 1998

(30) Foreign Application Priority Data

Apr. 22, 1997 (SE) .................................................. 9701504

(51) Int. Cl.⁷ ....................................................... B01F 5/00
(52) U.S. Cl. .................................. 137/625.33; 366/176.1; 366/340
(58) Field of Search ....................... 137/625.33; 251/127; 366/176.1, 176.2, 340

(56) References Cited

U.S. PATENT DOCUMENTS

| | | | | |
|---|---|---|---|---|
| 3,853,268 | * | 12/1974 | Schneider | 137/625.33 |
| 5,217,037 | * | 6/1993 | Bristol | 137/14 |
| 5,899,564 | * | 5/1999 | Kinney et al. | 366/176.2 |

FOREIGN PATENT DOCUMENTS

| | | |
|---|---|---|
| 37 28 946 | 3/1989 | (DE) . |
| 123 507 | 7/1972 | (DK) . |
| 506 039 | 11/1997 | (SE) . |

* cited by examiner

*Primary Examiner*—John Fox
(74) *Attorney, Agent, or Firm*—Burns, Doane, Swecker & Mathis, L.L.P.

(57) ABSTRACT

Valve (1) has a pressurised movable valve cone (5), valve seat (6) and a valve housing (2) surrounding cone (5) and seat (6). Cone (6) is disposed such that a throttle occurs between them, constituting a homogenisation gap. The gap is concentrically disposed along the throttle.

10 Claims, 2 Drawing Sheets

HOMOGENIZER VALVE

FIELD OF THE INVENTION

The present invention relates to apparatus for homogenizing liquids such as milk, and more particularly to valves for forming a homogenization gap.

BACKGROUND OF THE INVENTION

Homogenization is an industrial process which has long been in use and which is intended, in a fat emulsion such as, for example, milk, to split the largest fat globules into smaller fat globules and by such means stabilise the fat emulsion. For, for example, milk, this implies that cream settling is prevented, and the greater part of all consumer milk today is homogenized.

The homogenization normally takes place by a mechanical processing, such that the fat emulsion, which is at a high input pressure, is forced to pass at high speed through a very tight gap where the fat globules of the emulsion are broken up as a result of the turbulence which occurs at high speeds and by cavitation bubbles which implode in the liquid. The process takes place during a very short period of time and what happens during this period of time is that the speed of the fat emulsion on passage increases while the pressure reduces, with the result that the liquid will boil.

A homogenizer consists essentially of a large piston pump which gives a high pressure, and a counterpressure device, where the homogenization proper takes place. The counterpressure device, the homogenizer valve in turn consists of a pressurised, resilient valve cone, a valve seat and a wear ring, and a valve housing which surrounds the valve cone and the valve seat. The valve cone and the seat are normally rotation-symmetric and are disposed such that, between these two parts, a radial throttle occurs, which constitutes a homogenization gap. The height, width and length of the gap determine the volume at which the homogenization takes place. This volume should be as slight as possible in order to obtain an efficient homogenization. The gap height is reduced at a higher pressure of the liquid which is to be homogenized, at the same time as a greater flow implies that the gap height is increased.

Above all in the homogenization of pasteurized milk, compared with UHT-treated milk, use is made of lower pressure at the same time as the intention is to increase the flow quantity. This implies in turn that the homogenizer valve would need to be made larger, so that the gap height is reduced in order to obtain a thorough homogenization at this lower pressure and increased flow. However, it has proved that an up-scaling of existing, well-functioning homogenizer valves does not always work as satisfactorily in practice. The larger the pressurised surface obtained, the greater will be the forces which occur and the homogenizer valve must be even larger. At the same time, the costs for such a homogenizer valve increase by several factors.

Another method of solving the problem is to connect in parallel a number of homogenization gaps and, by such means, obtain an extension of the gap length and thereby a reduction of the gap height. This type of homogenizer valve with parallel-connected homogenization gaps has, however, an as good as fixed gap height. It also suffers from the drawback of suffering from wear in an uneven and uncontrollable manner, which negatively affects the homogenization result.

Swedish Patent Application SE 9600792-7 displays yet a further solution to how the gap length may be extended, in that the homogenization gap has been given undulating pattern along the radial throttle.

SUMMARY OF THE INVENTION

One object of the present invention is to realise a homogenizer valve with a gap height of the homogenization gap which is lower, but which may be varied when pressure and flow vary.

A further object of the present invention is to design a valve seat which may be retrofitted in existing homogenizer valves of standard type, but which has a considerably longer gap length and may thereby be employed for much greater flows, without the major costs which a considerably larger homogenizer valve would incur.

Yet a further object of the present invention is that the homogenizer valve permit efficient washing and otherwise satisfy the extremely high demands which are placed on food handling.

Invention by a homogenizer apparatus including a housing having a movable valve cone mounted in the housing and a valve seat mounted in the housing. A valve unit is secured to the valve cone so that the valve cone and the valve unit are movable axially toward and away from the valve seat. The housing has an inlet and an outlet. The valve seat is positioned adjacent to the inlet and the valve unit on the valve cone is positioned adjacent the outlet. The valve seat has inlet channels communicating between the inlet and the valve unit and the valve unit has outlet channels communicating between the valve unit and the outlet. The outlet channels are radially offset from the inlet channels and the valve unit and the valve seat each are in the form of a ring. This arrangement provides improved homogenization.

BRIEF DESCRIPTION OF THE ACCOMPANYING DRAWINGS

One preferred embodiment of the present invention will now be described in greater detail hereinbelow, with reference to the accompanying Drawings, in which.

The Drawings show only those details essential to an understanding of the present invention, and the placing of the homogenizer valve in the homogenizer, which is well-known to a person skilled in the art, has been omitted.

DETAILED DESCRIPTION OF THE INVENTION

Figure 1:
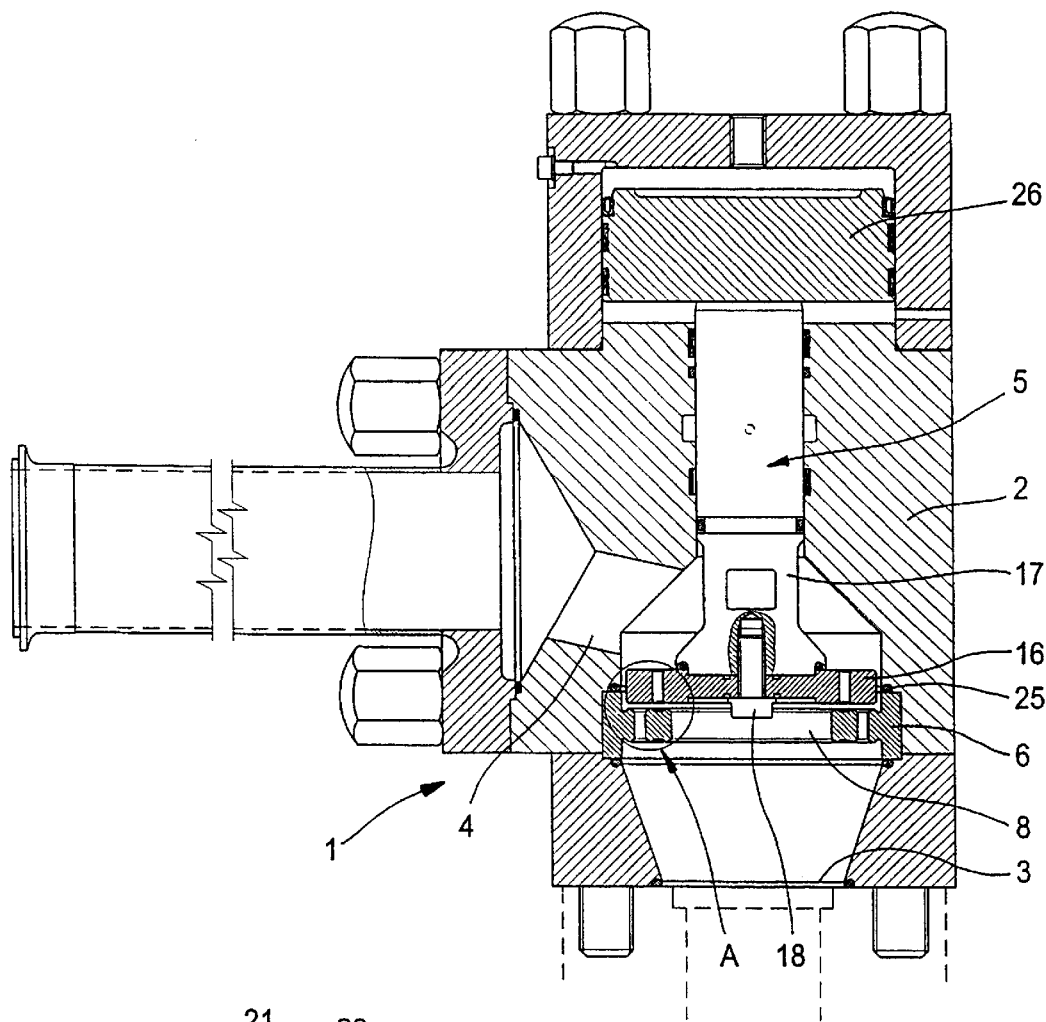
FIG. 1 shows, partly in section, a side elevation of the apparatus according to the invention.

A homogenizer valve 1 according to the present invention, as illustrated in FIG. 1, consists substantially of a valve housing 2 with an inlet 3 and an outlet 4 for the liquid which is to be homogenized, and also a valve cone 5 and a valve seat 6. The valve cone 5 and the valve seat 6 are disposed such that there occurs between them a throttle, a homogenization gap 7.

In the preferred embodiment, the valve seat 6 is rotation-symmetrical and has a central through flow passage 8 for the liquid which is to be homogenized, constituting an extension of the inlet 3 of the homogenizer valve 1. From a central plane 9, the valve seat 6 is designed such that it is identical on both sides of the central plane 9 and thus may be reversed in the valve housing 2, which implies a doubled service life for the valve seat 6. Outermost towards its periphery, the valve seat 6 is provided with a collar 10 which serves the same function as the wear ring in conventional homogenizer valves and, thereby, replaces this part.

Figure 4:
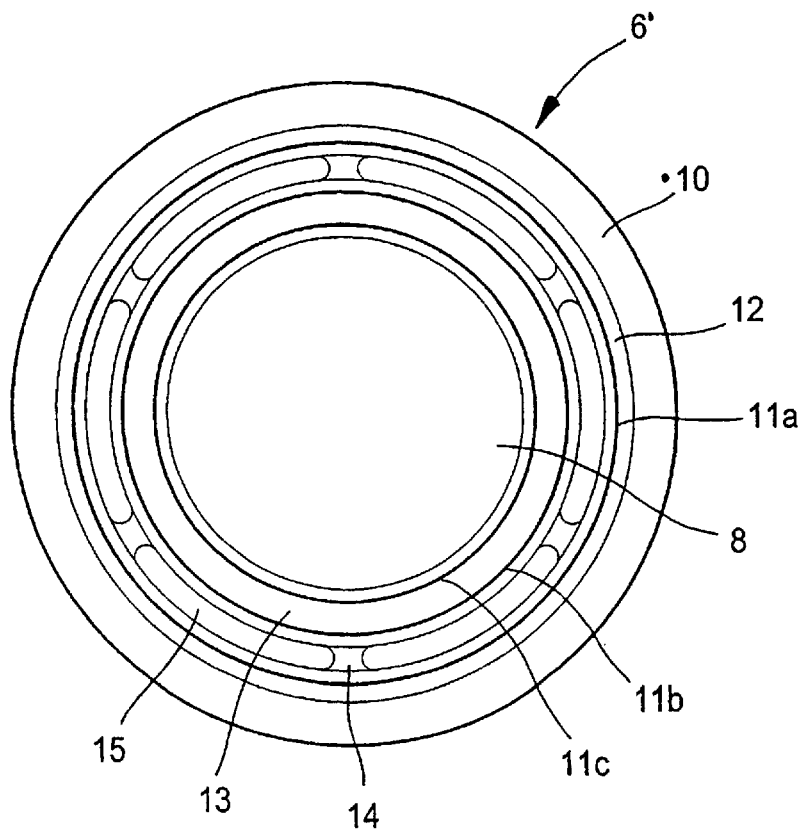
FIG. 4 shows a top plan view of the valve seat

Inside the collar 10, the valve seat 6 has between two and five elevations 11. These elevations 11 constitute the one bounding definition of the homogenization gap 7. As shown in FIG. 4, the elevations 11 are concentrically disposed around the through flow passage 8 and are, in the preferred embodiment, three in number. The elevations 11 are disposed such that the elevation 11a most proximal the collar 10 is placed on a part 12 of the valve seat which is entirely contiguous with the collar 10. The elevations 11b and 11c are placed on a part 13 which is contiguous with the part 12 only by the intermediary of narrow interconnecting bridges 14. Between the parts 12 and 13 there will thus be obtained channels 15 for a portion of the liquid which is to be homogenized.

Figure 2:
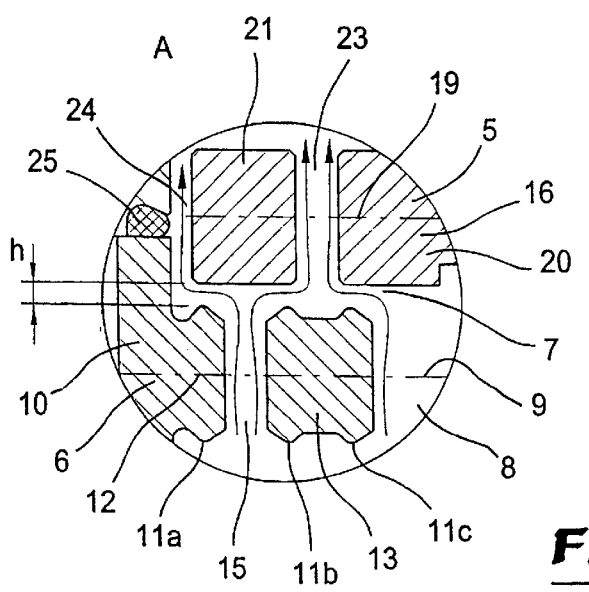
FIG. 2 shows, partly in section, a magnified detail encircled at A in FIG. 1.

The elevations 11 may be designed as in the preferred embodiment and as shown in the detailed illustration in FIG. 2, with a slight upper plane which is at an angle to the surrounding surface. Alternatively, the elevations 11 may be designed with a wider upper plane and with straight bounding definitions to surrounding surfaces.

The valve cone 5, which is also rotation-symmetrical, is pressurised, normally by means of a hydraulic or pneumatic piston 26, but may, in simpler versions, be pressurised by means of a set screw which acts via a spring. The valve cone 5 is also movable, for example by means of oil in the cylinder, in order to absorb the rapid flow variations which occur in the liquid which is to be homogenized. This elasticity is necessary to handle the flow variations which naturally occur in piston pumps.

The valve cone 5 is placed in the valve housing 2 such that there occur, between the valve cone 5 and the elevations 11 of the valve seat 6, concentrically disposed homogenization gaps 7 of a height h. The side of the valve cone 5 facing towards the valve seat 6 constitutes the second bounding definition of the homogenization gap 7. The height h of the homogenization gap 7 may be varied with varying pressure and flow, in that the valve cone 5 is moved closer to or further away from the valve seat 6. In the preferred embodiment, the valve seat 6 has three concentrically disposed homogenization gaps 7.

In the preferred embodiment, the valve cone 5 is designed such that the lower portion facing towards the valve seat 6 consists of a separate unit 16, this unit being secured on a central portion 17 of the valve cone 5. The unit 16 may, for example as shown in FIG. 1, be secured by means of a screw 18. From a central plane 19, the unit 16 is designed such that it is identical on both sides of the central plane 19 and is thus reversible, which implies a doubled service life for the unit 16 of the valve cone 5.

Figure 3:
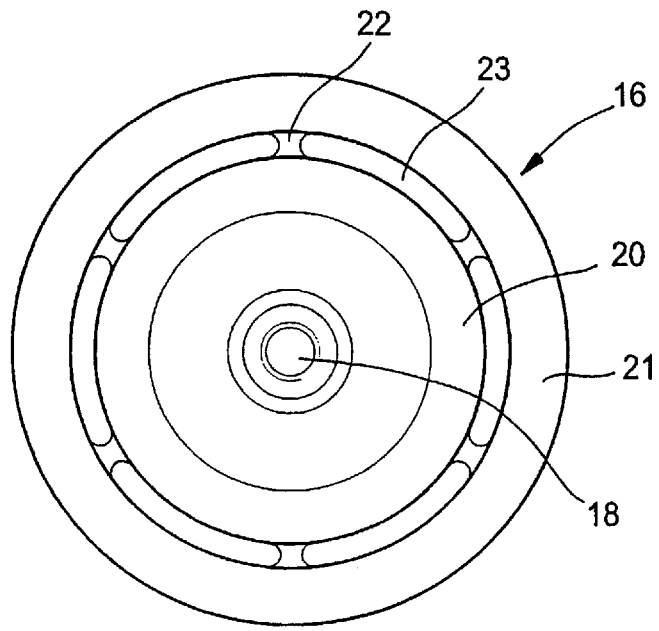
FIG. 3 shows a top plan view of a portion of the valve cone.

As shown in FIG. 3, the unit 16 of the valve cone 5 is designed such that it has a whole central portion 20 and a portion 21 concentrically surrounding this portion 20 and contiguous with the central portion 20 only by the intermediary of narrow interconnecting bridges 22. Between these portions 20 and 21, there thus occur channels 23 for the liquid which has been homogenized.

The liquid, normally milk, which is to be homogenized is led into the homogenizer where it is pressurised to approx. 10–25 Mpa. The milk normally has a fat content of 0.5–3.5% and is at a temperature of 55–80° C.

The liquid is led in through the inlet 3 and, as shown by arrows in FIG. 2, when it reaches the valve seat 6, the liquid is divided, partly in the through flow channel 8 and partly in the channels 15. Thereafter, the liquid passes one of the three homogenization gaps 7 where homogenization takes place and the liquid thereafter distributes itself, partly through the channels 23 and partly through a channel 24 formed between the valve cone 5 and the collar 10 of the valve seat 6. Since the liquid always strives to follow the simplest route, there will be obtained a relatively uniform distribution of liquid through the three homogenization gaps 7. After homogenization, the liquid passes out of the homogenizer valve 1 through the outlet 4.

The gap height h is normally 50–200 $\mu$m. In the passage, there is a very rapid pressure drop, down to 0 Mpa, at the same time as the speed of flow of the liquid increases, with the result that the liquid begins to boil. When the liquid leaves the gap 7, its speed is reduced and the pressure once again increases. The liquid ceases to boil and the vapour bubbles in the liquid implode. The entire process takes place in the space of a few fractions of a second and, in the violent processes where the high speed gives rise to turbulence and cavitation, the fat particles which are in the liquid will be split into smaller particles or globules.

By obtaining a uniform distribution of the liquid between the three homogenization gaps 7, and also that the liquid passes at right angles over the gap 7, there will be obtained en extremely efficient utilisation of the increased gap length, and a homogenizer with a homogenizer valve 1 according to the present invention is capable of handling roughly three times as large a flow as a conventional homogenizer valve. In order to handle the same flow in a conventional homogenizer valve, this would need to be scaled up approximately nine times, concerning weight and volume, and the cost for such a homogenizer valve would be more than ten times greater.

Given that the valve seat 6 and the unit 16 of the valve cone 5 display hygienic seals 25 against the valve housing 2 and against the portion 17, respectively, there will be obtained a hygienic homogenizer valve 1 which satisfies the requirements of the food industry and which may be washed using conventional equipment.

As will have been apparent from the foregoing description, the present invention realises a homogenizer valve 1 which may be employed for retrofitting in existing homogenizers, but which is capable of handling roughly three times as large a flow as a corresponding conventional homogenizer valve.

What is claimed is:

1. A homogenizer apparatus comprising a housing having a movable valve cone mounted in the housing, a valve seat mounted in the housing, a valve unit secured to the valve cone, the valve cone and the valve unit being movable axially toward and away from the valve seat, the housing having an inlet and an outlet, the valve seat being positioned adjacent the inlet, the valve unit being positioned adjacent the outlet, the valve seat having inlet channels communicating between the inlet and the valve unit, the valve unit having outlet channels communicating between the valve unit and the outlet, the outlet channels being radially offset from the inlet channels such that a throttle occurs in an homogenization gap between the valve unit and the valve seat, and the valve unit and the valve seat each being in the form of a ring.

2. The homogenizer apparatus as claimed in claim 1 wherein the valve cone and the valve seat are rotation-symmetrical.

3. The homogenizer apparatus as claimed in claim 1 wherein the channels include radial channels between the valve unit and the valve seat.

4. The homeogenizer apparatus as claimed in claim 1, wherein the homogenization gap has at least two concentric gaps.

5. The homogenizer apparatus as claimed in claim 1, wherein the valve seat includes a collar, a first part contiguous with the collar, and a second part which is continuous with the first part by the intermediary of narrow interconnecting bridges, for the formation of channels between the first and second parts.

6. The homogenizer apparatus as claimed in claim 5, wherein the parts of the valve seat have elevations placed such that one elevation in place on the first part and that two elevations are placed on the second part, said elevations constituting the one bounding definition of the homogenization gap.

7. The homogenizer apparatus as claimed in claim 1 wherein the valve seat has a central plane, the valve seat is designed such that it is identical on both sides of the central plane.

8. The homogenizer apparatus as claimed in claim 1 wherein the valve cone has a central portion, said valve unit being secured by means of a screw on that end of the central portion which is turned to face towards the valve seat.

9. The homogenizer apparatus as claimed in claim 8, wherein the valve unit has a central portion and a portion concentrically surrounding the central portion and contiguous with the central portion by the intermediary of narrow interconnecting bridges for the formation of channels between the portions.

10. The homogenizer apparatus as claimed in claim 1 the valve unit has a central plane, and is identical on both sides of the central plane.

* * * * *